Figure 1:
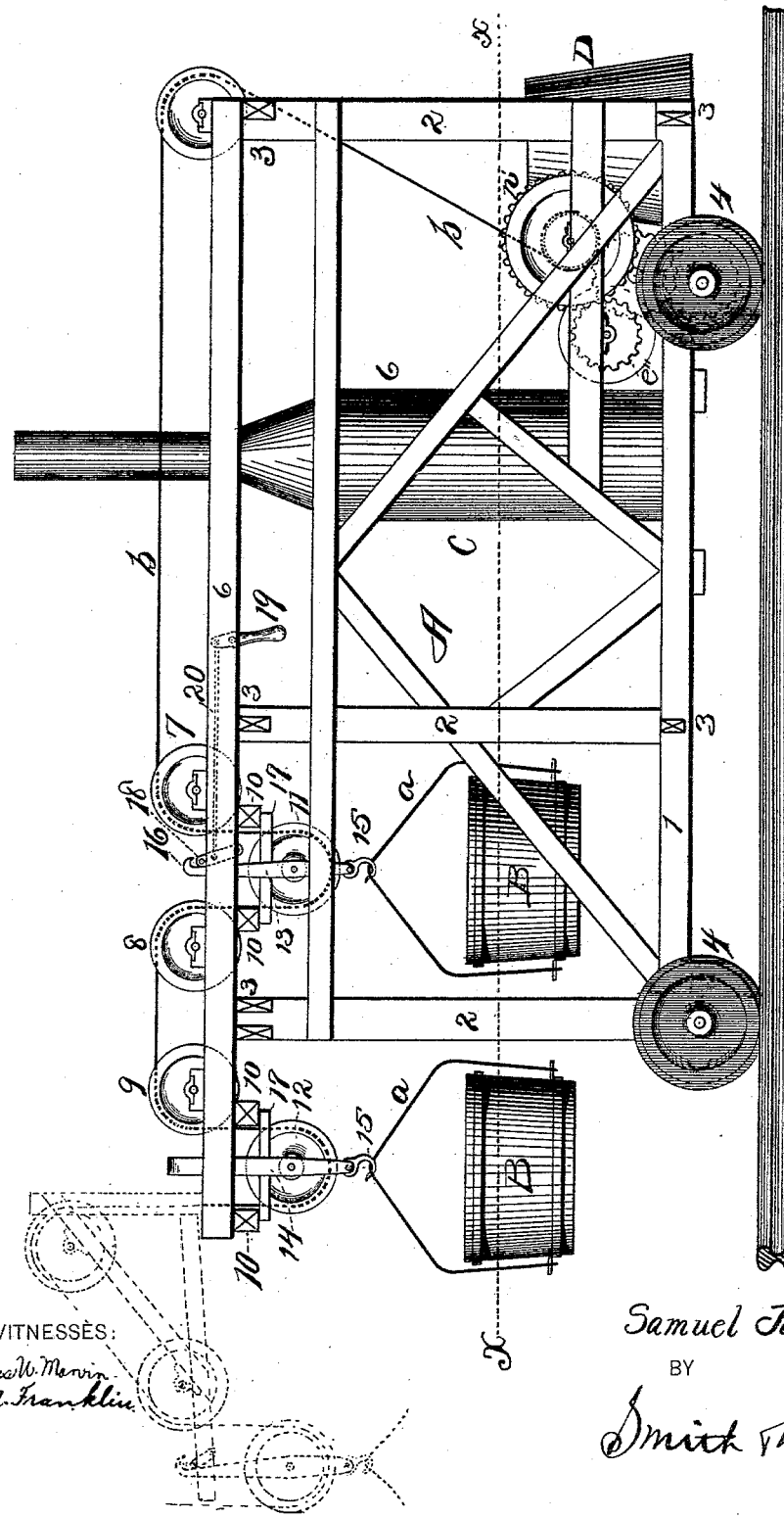

(No Model.) 2 Sheets—Sheet 1.

S. JACKSON.
BUCKET HOISTING AND CONVEYING MACHINE.

No. 602,851. Patented Apr. 26, 1898.

WITNESSES:
Charles M. Marvin
M. A. Franklin

INVENTOR
Samuel Jackson.
BY
Smith & Denison
ATTORNEYS.

(No Model.) 2 Sheets—Sheet 2.
S. JACKSON.
BUCKET HOISTING AND CONVEYING MACHINE.
No. 602,851. Patented Apr. 26, 1898.
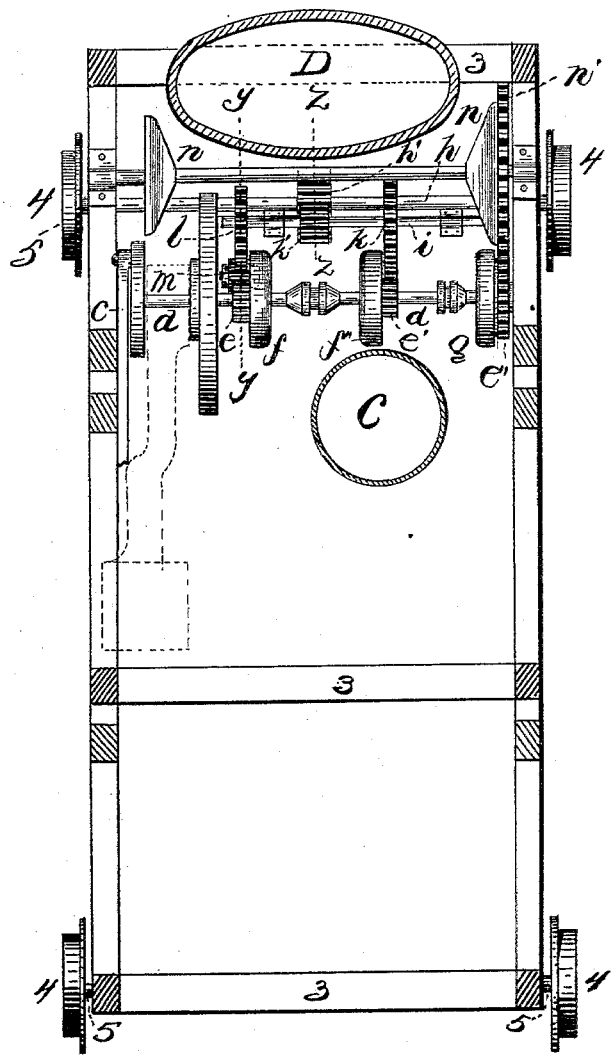
Fig. 2.
Fig. 3. Fig. 4.
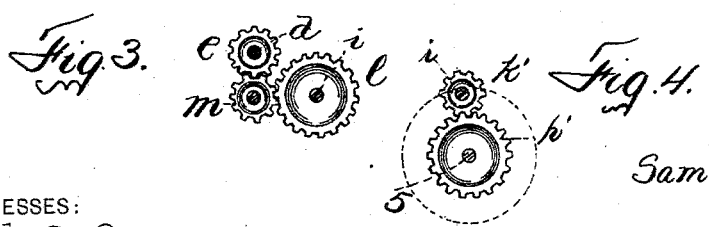
WITNESSES:
Charles W. Morvin
Mary A. Franklin
INVENTOR
Samuel Jackson
BY
Smith & Benson
ATTORNEYS.

UNITED STATES PATENT OFFICE.

SAMUEL JACKSON, OF SYRACUSE, NEW YORK, ASSIGNOR TO GEORGE D. GRANNIS, MARLIN R. GRANNIS, CHARLES W. GRANNIS, AND EDWIN JACKSON, OF SAME PLACE.

BUCKET HOISTING AND CONVEYING MACHINE.

SPECIFICATION forming part of Letters Patent No. 602,851, dated April 26, 1898.

Application filed March 5, 1897. Serial No. 626,105. (No model.)

*To all whom it may concern:*

Be it known that I, SAMUEL JACKSON, of Syracuse, in the county of Onondaga, in the State of New York, have invented new and useful Improvements in Bucket Hoisting and Conveying Machines, of which the following, taken in connection with the accompanying drawings, is a full, clear, and exact description.

This invention relates to dredging-machines, having more particular reference to the apparatus for removing dirt from the forward end of the trench at a point where the excavating is being done and carrying it rearward and depositing it within the trench after the pipe has been laid or the work in hand accomplished.

My object is to produce such an apparatus cheap and durable in construction, positive in its operation, and of great utility; and to that end my invention consists in the several new and novel features of construction and operation hereinafter described and of the several new and novel combinations of parts, which are fully set forth in the claims hereunto annexed.

It is constructed as follows, reference being had to the accompanying drawings, in which—

Figure 1 is a side view of the machine complete, showing the construction and operation of the hoisting and conveying machine complete, with buckets and an appliance for an extra bucket upon the forward end. Fig. 2 is a top plan view on line X X in Fig. 1, the buckets being removed. Fig. 3 is a section on $y$ $y$, Fig. 2. Fig. 4 is a section on $z$ $z$, Fig. 2.

Similar letters and figures of reference represent corresponding parts.

A is a frame comprising sills 1, uprights 2, and cross-pieces 3, all constructed in the ordinary way and braced in any ordinary manner to give it lateral support.

The frame A is mounted upon wheels 4, which are connected by axles 5 in the ordinary way. Upon the top of the frame is mounted the sills 6, upon which are mounted pulleys 7, 8, and 9, said sills being connected by cross-bars 10, as shown.

B are buckets provided with bails $a$, mounted and adapted to be reversed in the ordinary way.

11 and 12 are wheels or pulleys mounted upon arms 13 and 14, the lower end of the arm being provided with a hook 15 or suitable means for connecting it to the bail $a$, the upper end of the arm 13 being provided with a hook 16 for the purposes hereinafter set forth. Upon the arms 13 and 14 are cross-pieces 17, which are adapted to engage with the cross-pieces 10, so as to prevent the rollers or pulleys 11 and 12 from being raised any higher than the position shown in the drawings when the chain $b$ is tightened.

18 is an arm pivoted to the sill 6, adapted to engage with the hook 16, so as to hold a bucket in the raised position. This arm 18 is operated by a lever 19, connecting rod 20, or in any other suitable manner.

C is the boiler, which imparts steam to the piston and causes the piston-rod $c$ to rotate the shaft $d$. Upon this shaft are cog-wheels $e$, $e'$, and $e''$, and $f$, $f'$, and $g$ are frictional clutches.

$h$ is the axle, rigidly secured to the wheels and is provided with a cog $h'$.

$i$ is an intermittent shaft having cogs $k$, $k'$, and $l$ mounted thereon, and $m$ is an intermittent cog mounted beneath the cogs $e$ and $l$ and adapted to mesh with them.

$n$ is a spool upon which the chain $b$, which raises and lowers the buckets, is wound, having upon one end the cog $n'$, adapted to engage cog $e''$ upon the fly-shaft $d$.

The rope or chain $b$ is secured at one end to the forward end of the top sill of the frame, and the opposite end is wound on the spool or windlass $n$.

D is a water-tank for supplying the boiler.

When it is desired to wind the chain $b$, so as to raise the buckets, I throw the cog $e''$, by means of the frictional clutch $g$, into engagement with the cog $n'$ upon the spool, which causes the spool to rotate, and by throwing the cog $e''$ out of engagement the spool will unwind and allow the bucket to be lowered. By throwing the cog $e'$ into engagement with the cog $k$ upon the shaft $i$ I rotate the cog $k'$, which meshes with the cog $h'$ upon the axle and rotates said axle and wheels, allowing the machine to move forward upon the track. To reverse the movement, I throw the cog $e$ into engagement with the intermediate cog $m$, which will turn cog $l$ upon the intermediate shaft $i$, and cog $k'$ rotates the cog $h'$ in the opposite direction, so as to cause the machine to move backward.

Having described my invention, what I claim, and desire to secure by Letters Patent, is—

1. In a bucket hoisting and conveying apparatus, the combination of a frame mounted upon wheels, means upon said frame for rotating said wheels for the purpose of propelling the frame to and fro, buckets provided with bails, pulleys having downward-extending hooks adapted to engage with said bails, and upward-extending arms terminating in hooks, and laterally-extending arms for the purpose of limiting the upward movement of the pulleys, a rope or chain secured at one end to the forward end of the top sills of the frame, and its opposite end provided with means for winding it up, said rope or chain being adapted to engage with the pulleys for the purpose of raising and lowering them, and means for holding the said pulleys in their raised position as set forth.

2. In a bucket hoisting and conveying apparatus, the combination of a frame mounted upon wheels and having idlers suitably mounted upon top, buckets provided with bails, pulleys having downward-extending hooks adapted to engage with said bails, and upward-extending hooks adapted to engage with said arms 18 for the purpose of holding them in their raised position, a rope or chain secured at one end to the forward end of the top sill of the frame, its opposite end adapted to be wound upon a windlass and adapted to travel over said idlers and engage with the pulleys substantially as described for the purposes set forth.

In witness whereof I have hereunto set my hand on this 9th day of February, 1897.

SAMUEL JACKSON.

In presence of—
C. W. SMITH,
HOWARD P. DENISON.